US012771058B2

(12) United States Patent
Seibuchner et al.

(10) Patent No.: US 12,771,058 B2
(45) Date of Patent: Oct. 20, 2026

(54) COIL SPRING WITH A CLOSED LONGITUDINAL COMPONENT AND CONNECTOR WITH A COIL SPRING

(71) Applicant: ODU GmbH & Co. KG, Muehldorf a. Inn (DE)

(72) Inventors: Stefan Seibuchner, Pleiskirchen (DE); Thomas Neuburger, Simbach a. Inn (DE); Gerhard Nicklbauer, Muehldorf a. Inn (DE)

(73) Assignee: ODU GmbH & Co. KG, Muehldorf a. Inn (DE)

( * ) Notice: Subject to any disclaimer, the term of this patent is extended or adjusted under 35 U.S.C. 154(b) by 205 days.

(21) Appl. No.: 18/228,293

(22) Filed: Jul. 31, 2023

(65) Prior Publication Data

US 2024/0047915 A1 Feb. 8, 2024

(30) Foreign Application Priority Data

Aug. 2, 2022 (EP) .................................... 22188276

(51) Int. Cl.
*H01R 13/508* (2006.01)
*F16F 1/12* (2006.01)
(Continued)

(52) U.S. Cl.
CPC ........... *H01R 13/508* (2013.01); *F16F 1/128* (2013.01); *H01R 13/639* (2013.01); *H01R 24/60* (2013.01); *F16F 2230/0058* (2013.01)

(58) Field of Classification Search
CPC ................ H01R 13/508; H01R 13/639; H01R 13/2421; H01R 4/48; H01R 11/12
See application file for complete search history.

(56) References Cited

U.S. PATENT DOCUMENTS 4,227,601 A 10/1980 Pilatowicz
4,355,854 A 10/1982 Williams
(Continued)

FOREIGN PATENT DOCUMENTS

CN 101682137 A 3/2010
CN 105556757 A 5/2016
(Continued)

OTHER PUBLICATIONS

Chinese Search Report, Application No. 2023109622593, Date of Filing: Aug. 2, 2023, 2 pages.
(Continued)

*Primary Examiner* — Oscar C Jimenez
(74) *Attorney, Agent, or Firm* — Harris Beach Murtha Cullina PLLC; Laura W. Smalley

(57) ABSTRACT

A coil spring has longitudinal component, located within the coil spring, running along the direction of a longitudinal axis of the coil spring. The longitudinal component may be a simple loop or may bias the coil spring into a different shape. The longitudinal component may have a first end and a second end, which may be connected. The first end, second end and longitudinal component may be in the same plane throughout the length of the longitudinal component. The longitudinal component may have a first end equipped with a first locking element and second end equipped with a second locking element. The first locking element may comprise a recess for accommodating a second locking element. The longitudinal component may be a metal wire and/or formed as a single piece. The coil spring may be part of a connector part connected with a mating connector part.

13 Claims, 6 Drawing Sheets

(51) Int. Cl.
*H01R 13/639* (2006.01)
*H01R 24/60* (2011.01)

(56) References Cited

U.S. PATENT DOCUMENTS

| | | | | |
|---|---|---|---|---|
| 7,999,202 | B2 * | 8/2011 | Fujita | H01R 13/17 439/840 |
| 9,909,636 | B2 | 3/2018 | Kompa et al. | |
| 2010/0102518 | A1 * | 4/2010 | Gao | F16J 15/3236 277/554 |
| 2014/0259617 | A1 * | 9/2014 | Kompa | B23P 11/00 267/167 |
| 2016/0047473 | A1 * | 2/2016 | Foster | F16F 1/045 267/1.5 |
| 2017/0373425 | A1 * | 12/2017 | Rust | H01R 13/2421 |
| 2018/0135714 | A1 | 5/2018 | Kompa et al. | |
| 2021/0344153 | A1 * | 11/2021 | Ivanov | H01R 4/48 |

FOREIGN PATENT DOCUMENTS

| | | | |
|---|---|---|---|
| CN | 106170602 | A | 11/2016 |
| EP | 3575627 | A1 | 12/2019 |
| WO | 2015068222 | A1 | 5/2015 |
| WO | WO-2015123407 | A1 | 8/2015 |

OTHER PUBLICATIONS

Chinese First Office Action, dated Apr. 8, 2026; Application No. 202310962259.3; Applicant; ODU Limited Compnay, 5 pages.

* cited by examiner

COIL SPRING WITH A CLOSED LONGITUDINAL COMPONENT AND CONNECTOR WITH A COIL SPRING

CROSS-REFERENCE TO RELATED APPLICATIONS

This application claims priority to and benefit of co-pending European Patent Application No. 22188276.4 filed on Aug. 2, 2022, which application is incorporated herein and by reference in its entirety.

DESCRIPTION

Field of the Invention

The invention relates to a coil spring comprising a longitudinal component located within the coil spring, wherein the longitudinal component runs generally along the direction of a longitudinal axis of the coil spring. The invention also relates to a method of shaping such a coil spring. Further, the invention relates to a connector part with such a coil spring. The invention moreover relates to a connector with a connector part that comprises the aforementioned coil spring.

Background of the Invention

From the international patent application WO 2015/123407 A1 a connect apparatus with a male component installed within a female component is known. The male component comprises an annular resilient outer member constructed as a metallic coiled spring with an inner retention member embedded within the coiled structure, which is constructed as a gift ring or key ring. The natural shape of the coiled spring is a ring shape. Also, the inner retention member in D1 has a ring shape.

The European patent application EP 3575627 A1 discloses a coil spring, ia, for use in a groove of a housing, which coil spring has a longitudinal component positioned within a plurality of interconnected coils of the coil spring. The longitudinal component runs along an axis of the coil spring in order to increase rigidity of the coil spring. This serves to avoid that the coil spring comes out of the groove when subjected to vibration or impact.

The U.S. Pat. No. 4,355,854 A discloses a coiled spring located in an annular space formed between a coupling nut and a body for locking the nut to the body when the nut is threaded in place. The coil spring has a metal core which is located within and extends through the coils of the spring to hold the spring in an annular configuration and confine coil movement to prevent crushing of the coils of the spring when the coupling nut is tightened.

Object of the Invention

It is an object of the present invention to provide an improved coil spring which comprises a longitudinal component located within the coil spring, wherein the longitudinal component runs generally along the direction of the longitudinal axis of the coil spring. Another object of the invention is to provide an improved method of shaping such a coil spring. It is a further object of the invention to provide an improved connector part with such a coil spring. Moreover, the invention aims at providing an improved connector with a connector part that comprises the afore-mentioned coil spring.

Solution According to the Invention

In the following, any reference to one (including the articles “a” and “the”), two or another number of objects is, provided nothing else is expressly mentioned, meant to be understood as not excluding the presence of further such objects in the invention. The reference numerals in the patent claims are not meant to be limiting but merely serve to improve readability of the claims.

According to one aspect of the invention, the problem is solved by a coil spring with the features of claim 1. The coil spring comprises a longitudinal component located within the coil spring, which longitudinal component runs generally along the direction of a longitudinal axis of the coil spring. The longitudinal component is closed or, alternatively, the longitudinal component is configured for being closed.

In the context of the present invention, a “coil spring” comprises a multitude of interconnected coils, such as turns, loops or windings. These coils preferably are identical.

In the context of the present invention, the “longitudinal axis” is the axis that extends into the longitudinal direction of the coil spring. The longitudinal direction is the direction in which the coils are arranged one after the other. The longitudinal axis can be straight or curved. For example, in the case of a circular annular coil spring, the axis is circular.

In the context of the present invention, the longitudinal component being “closed” means that the longitudinal component comprises or consists of a closed loop. For example, the longitudinal component may have been cut from a tube, it may be a ring that has been punched out or cut out of from a sheet, or it may be forged into the closed loop. Alternatively, the longitudinal component may be formed by fastening at least two parts—one or more of the parts preferably each being an end of the longitudinal component—along the length of a previously open longitudinal component, preferably at least two ends of the longitudinal component, to each other. In the context of the present invention, “fastening” in particular may be connecting with each other in a form-locking manner and/or in a force-locking manner and/or by materially joining.

The closed longitudinal component may be formed by irreversibly fastening at least two parts along the length of a previously open longitudinal component, preferably at least two ends, together. In the context of the present invention, “irreversible fastening” in particular encompasses one of the following: Materially joining (which includes the methods of welding, soldering and adhesive bonding), crimping or twisting, or by irreversibly knotting, interlocking, clamping, latching, or a combination of one or more of the forgoing methods. Alternatively, the at least two parts may be reversibly fastened to each other, for example by reversibly interlocking, latching, screwing, reversibly tying, magnetically fastening, or a combination of one or more of the forgoing methods. In this context, “reversibly fastened” in particular requires that the parts configured for being closed and opened non-destructively. Yet alternatively or additionally for the longitudinal component to be closed, the at least two parts may be biased against each other in the longitudinal direction of the longitudinal component by virtue of an elasticity of the longitudinal component.

The longitudinal component being “configured for being closed” means that it has at least two parts along its length, preferably at least two ends, which are shaped as or provided with locking elements for fastening.

Preferred Embodiments of the Invention

Preferred features of the invention which may be applied alone or in combination are discussed in the following and in the dependent claims.

In a preferred embodiment of the invention, the longitudinal component is in contact with the coil spring, preferably with the inner surface of the coil spring. The preferred longitudinal component biases the coil spring, preferably by virtue of being in contact with the coil spring, into a shape different from the coil spring's natural shape and/or the shape defined by a groove in which the coil spring is accommodated. In the context of the present invention, the coil spring's "natural shape" is its shape if neither an external force (such that of vibration, impact, a groove in which the coil spring is located, or the like) nor the longitudinal component act upon the coil spring. In the context of the present invention, "biasing" the coil spring in a shape different from its natural shape means that the coil spring is forced into this different shape.

Additionally or alternatively, the preferred longitudinal component biases the coil spring, preferably by virtue of being in contact with the coil spring, such that it changes, preferably reduces, the coil spring's circumference.

In this context, the coil spring's shape is the shape of the coil spring along its longitudinal axis. The natural shape may for example be circular, and the different shape may be trapezoid with rounded corners. Further in this context, the circumference is the extension of the coil spring along its longitudinal axis. The concept of shape as used in the context of the present invention, does not regard size. Therefore, a change in size—preferably expressed by means of circumference—does not necessarily entail a change in shape, and vice versa. Rather, the longitudinal component may, for example, reduce the circumference of an annular coil spring while maintaining its circular shape.

The preferred coil spring is resilient. Preferably, the longitudinal component biases the coil spring against its resilience into the shape different from its natural shape or into the shape different from the shape into which the coil spring is biased by the groove.

In a preferred embodiment of the invention, the coil spring is annular. Preferably, the annular coil spring is formed by joining, particularly preferably welding, two ends of the coil spring together. This coil spring, in turn, can consist of a row of multiple component coils joined at their ends. The term "annular" in the context of the present invention refers to any closed shape. In particular, annular does not imply circular. Yet, the natural shape of a preferred annular coil spring is essentially circular. Accordingly, in a preferred embodiment of the invention, the longitudinal component biases the annular coil spring into a shape different form a circular shape.

The coil spring can for example be a helical spring, a ribbon spring, a radial canted coil spring, or an axial canted coil spring or any similar type of spring. The preferred coil spring comprises or consists of an electrically conductive material, for example a metal wire. A preferred material of the coil spring is spring steel, copper or beryllium copper alloy. The invention encompasses both coil springs with an additional plating of the base material and coil springs that are not plated. The plating may for example be a material of particularly high electrical conductivity (if such high conductivity is desired) or hardness (if the coil spring is under heavy mechanical duty). The skilled person is aware of suitable base materials and plating materials depending on the particular application.

The preferred longitudinal component is resilient. Yet, the invention also encompasses embodiments in which the longitudinal-component is non-resilient, but, for example, floppy.

The longitudinal component preferably comprises or consists of a wire (for example a metal wire), a sheet, a band (such as a metal, plastic or rubber band), a thread, a fibre or a cord. A suitable material which the longitudinal component comprises or consists of is spring steel. In addition or alternatively, the longitudinal component comprises a plastic material or consists of a plastic material.

The invention encompasses embodiments in which the longitudinal component comprises of two, three or more portions, each portion being fastened—reversibly or irreversibly—to an adjacent portion, preferably by one or a combination of the methods discussed above in the context of fastening at least two parts along the length of a previously open longitudinal component to each other in order to close the longitudinal component. In particular, the longitudinal component may be a chain, the above-cited portions being the links of the chain.

In a preferred embodiment of the invention, the longitudinal component, when closed, extends along the entire length of the coil spring. The preferred longitudinal component is a simple loop, ie, it runs around the longitudinal axis of the coil spring once. Yet, the invention also comprises embodiments in which the longitudinal component is wound to have more than one turn, including fractional turns, for example 1.1 turns, 1.5 turns, 2 turns, or 3 turns. Especially for such embodiments, locking can be achieved in a force-locking manner between the turns.

Preferably, the longitudinal component increases or decreases the curvature of at least a section along the length of the coil spring as compared to the curvature this section has when the coil spring is in its natural shape and/or in the shape into which the coil spring is biased by the groove.

Preferably, the longitudinal component is non-circular. A preferred longitudinal component or at least a section of the preferred longitudinal component has the shape of a straight line, a segment of a circle, or a segment of an ellipse or another oval. More preferably, the longitudinal component comprises a combination of two, three or more of such segments. In particular, the shape of the preferred longitudinal component is different from a single segment of a circle.

In a preferred embodiment of the invention, the longitudinal component has at least one, preferably at least two, more preferably at least three, most preferably four straight sections. A preferred longitudinal component has the general shape of a trapezium, a parallelogram or a rectangle, preferably with rounded corners.

The invention also encompasses embodiments in which in addition to a first longitudinal component of the kind discussed above there are one or more further longitudinal components. Each of the further longitudinal components can have any combination of the properties of the longitudinal components discussed above. Preferably, the multiple longitudinal components overlap completely or at least partly along the longitudinal axis of the coil spring.

In a preferred embodiment of the invention, for fastening together—reversibly or irreversibly—the two parts of the longitudinal component, at least one, preferably each of these parts are provided with at least one locking element. In a particularly preferred embodiment of the invention, the longitudinal component comprises a first end equipped with a first locking element and second end equipped with a second locking element. The first locking element and the second locking element can be interlocked or configured for being interlocked. A locking element according to the present invention can be integral with the part (preferably end) of the longitudinal component or it may comprise one or more further, auxiliary component(s).

Suitable locking elements include a thread, a protrusion, a groove, a hook, an eyelet and a latching part. For example, one part may be provided with a hock while the other part is provided with another hook or an eyelet capable of interlocking with the hook. Additionally or alternatively, one part may be provided with a latching unit and the other part with a matching counter-latching unit. Further additionally, one part may be provided with a thread and the other with a matching counter-thread or a union nut comprising such matching counter-thread; the union nut is an example of an auxiliary component. Suitable locking elements also include a quick link (also generally referred to as a maillon or a maillon rapide), a carabiner (also referred to a karabiner or Karabiner), a shackle, a clevis fastener, or any other suitable shaped locking element.

In a particularly preferred embodiment of the invention, one part (preferably end) of the longitudinal element is provided with a recess, such as a groove that preferably extends perpendicularly to the longitudinal extension of the longitudinal element, as a locking element, and the other part (preferably end) comprises a protrusion as a locking element, which recess can accommodate the protrusion. Thereby, advantageously, the protrusion can be inserted into the recess and the protrusion can engage with the recess to interlock. The one part and the other part may each be provided with both a recess and a protrusion, the combination of the recess and the protrusion forming a hook.

In a preferred longitudinal component, the locking element of one part and the locking element of another, matching part of the longitudinal element are biased against each other to prevent the locking elements from unfastening. The bias force preferably extends perpendicularly to the longitudinal extension of the longitudinal component. In one embodiment, the bias force extends perpendicularly to a plane in which the longitudinal component extends, in another embodiment the bias force extends in such plane. The bias force preferably originates form a resilience of the longitudinal component or a part of the longitudinal component. Particularly preferably, by virtue of the bias force the one locking element latchingly engages with the other locking element, thereby forming a latching connection.

In a preferred embodiment of the invention, the first and a second end are materially connected to each other, for example by welding, soldering or adhesive bonding. Laser welding is particularly preferred.

The longitudinal component may for example be cut, preferably laser cut, or punched from a precursor product such as a tube or a sheet. Alternatively or additionally, the longitudinal component may be moulded or forged. Preferably, the longitudinal component comprises or consists of a polymeric material, a metal or an alloy. In some embodiments, the longitudinal component is formed as a single piece.

In some embodiments of the invention, the coil spring is closed, ie, the coils of the coil spring are interconnected in an end-less fashion. In alternative embodiments of the invention, the coils spring is open; this requires that each of at least two coils of the coil spring on one of its sides is not connected to another coil but forms an end of the coil spring. In some embodiments, coils at least two locations, preferably at the ends of the coil spring, are provided with locking elements for fastening; in other embodiments, there are no such locking elements.

In some embodiments of the invention, the longitudinal component is in a closed state before being combined with the coils to form the coil spring according to the present invention. Preferably, in the step of combining the longitudinal element with the coils, the coils are wound around the longitudinal component to form the coil spring according to the invention. In one embodiment, after they having been wound around the longitudinal element, the ends of the coil spring are joined together; in another embodiment, the ends of the coil spring are left open. When they are joined together, this may be achieved by any of the fastening means discussed with regard to the longitudinal component, for example connecting the ends of the coil spring in a form-locking manner and/or in a force-locking manner and/or by materially joining.

In some embodiments of the invention, the longitudinal component is in an open state before being combined with the coil spring comprising the interconnected to form the coil spring according to the present invention. Preferably, the coil spring is likewise in an open state. It is an achievable advantage of this arrangement that the longitudinal component can be combined with the coil spring simply by sliding the coils spring over the longitudinal component. It is another achievable advantage of this arrangement that the ends of the longitudinal component are easily accessible for closing. Accordingly, in a preferred next step once the coil spring has been slid over the longitudinal component, the longitudinal component is closed. In one embodiment, after the longitudinal component has been closed, the ends of the coil spring are joined together; in another embodiment, the ends of the coil spring are left open. As discussed before, when the ends of the coil spring are joined together, this may be achieved by any of the fastening means discussed with regard to the longitudinal component, for example connecting the ends of the coil spring in a form-locking manner and/or in a force-locking manner and/or by materially joining.

The invention also encompasses embodiments, in which the coils spring is in a closed state before being combined with the longitudinal component and the longitudinal component is in an open state. It is an achievable advantage of this arrangement that the longitudinal component can be threaded into the closed coil spring through the spaces between adjacent coils. Preferably, once the longitudinal component has been placed inside the coil spring, the longitudinal component is closed. Again, in one embodiment after the longitudinal component has been closed, the ends of the coil spring are joined together; in another embodiment, the ends of the coil spring are left open. As discussed before, when the ends of the coil spring are joined together, this may be achieved by any of the fastening means discussed with regard to the longitudinal component, for example connecting the ends of the coil spring in a form-locking manner and/or in a force-locking manner and/or by materially joining.

The preferred connector part has a groove in which the coil spring is accommodated. The preferred groove is on a sleeve of the connector, which sleeve, preferably, forms the housing or part of the housing of the connector part, or is attached to the housing of the connector part. The groove may be placed on the inner or the outer surface of the sleeve.

The shape of a preferred groove comprises a combination of one or more of segments in the shape selected from the group consisting of a straight line, a segment of a circle, or a segment of an ellipse or another oval. In a preferred embodiment of the invention, the groove has at least one, preferably at least two, more preferably at least three straight sections.

A preferred groove is annular. Preferably, the annular groove is non-circular. Rather, a preferred annular groove has the general shape of a trapezium, a parallelogram or a rectangle, preferably with rounded corners.

In a preferred embodiment of the invention, the longitudinal component biases at least a segment of the coil spring towards the groove. In the context of the present invention, “towards the groove” means that due to the longitudinal component, a distance between the segment of the coil spring and the bottom of the groove is reduced or eliminated. Preferably, more than one segment of the coil spring, for example two segments of the coil spring, are biased towards the groove. Two such segments may for example be arranged on opposite sides of the connector part.

In a preferred connector, when a connector part comprise the coil spring with the longitudinal element is mounted into the connector part’s groove, the longitudinal component urges at least part(s) of the coil spring, against at least part(s) of the groove, in which the coil spring is accommodated. Preferably, the longitudinal component urges this/these at least part(s) of the coil spring against more specifically the bottom(s) of this/these at least part(s) of the connector part’s groove. In other words, the longitudinal element’s shape and resilience is such that it biases the at least part(s) of the coil spring into and against the groove. It is an achievable advantage of this embodiment of the invention that due to the longitudinal element’s bias, at least part(s) of the coil spring is/are clamped into the groove. Thereby, in particular, the at least part(s) of the coil spring can be held firmly in the groove.

Preferably, in a connector part with a longitudinal component that has two ends, at least one of the ends, particularly preferably both ends, is/are fixed to another component of the connector part. This other component preferably is the component on which the groove is placed, for example the sleeve. More preferably, the end(s) is/are fixed to the other component inside the groove. Particularly, at least one end of the longitudinal component is fixed to a housing of the connector part.

The preferred connector part is a plug or a receptacle. Accordingly, the preferred connector is a plug-in connector wherein for mating the connector part is inserted into the mating connector part or vice versa.

Preferably, the coil spring provides an electrical contact between the connector part and the counter connector part when the two are mated. It is preferred that when the connector part is mated with the mating connector part, at least part of the coil spring is loaded between the connector part and the mating connector part. Thereby, advantageously, a well-defined electrical contact between the connector part and the coil spring on one hand and the coil spring and the mating connector part on the other hand, and thus from the connector part to the mating connector part (namely, via the coil spring) can be provided. Yet, the invention also encompasses embodiments in which the coil spring is placed between the connector part and the mating connector part when the connector part is mated with the mating connector part, without being loaded.

The electrical contact preferably is between a shielding member of the connector part and a shielding member of the mating connector part. It is an achievable advantage of this embodiment of the invention that a continuity of radio frequency shielding from the connector part to the mating connector part can be obtained.

Preferably, the coil spring serves to mechanically attach the connector part to the mating connector part, more preferably it serves to removably attach the connector part to the mating connector part. A preferred mating connector comprises a groove for at least part of the coil spring to latch into. Thereby, it can advantageously be achieved that the connector part can be latchingly attached to the mating connector part of the connector. Preferably, the groove of the mating connector part is shallower than the groove of the connector part. Thereby it is achievable that upon separation of the connector part from the mating connector part, the coil spring remains on the connector part. A mechanical attachment of the connector part to the mating connector part does not necessarily require that the coil spring is loaded between the connector part and the mating connector part when the two are mated. Accordingly, in one embodiment of the invention where the coil spring serves to mechanically attach the connector to the mating connector, the coil spring is not loaded between the connector part and the mating connector part when the connector part and the mating connector part are mated. Rather particularly preferably, it is placed to fit without compression into the space provided between the connector part and the counter connector part at the location of the coil spring.

While in some embodiments the groove has a uniform depth, in other embodiments the groove’s depth is non-uniform. As a result of such non-uniform depth, if the groove is applied to the housing or a part of the housing of the connector part, the grove will not follow the general shape of the housing or the part of the housing. Advantageously, with the non-uniform depth of the groove it is achievable that the coils spring, when accommodated inside the groove, the distance between the top of the grove and the top of the coil spring (ie, the groove’s outer edge), both measured from the bottom of the groove differ. For example, at some locations along the groove, the coil spring extends beyond the outer edge of the groove, and in other locations it does not or it extends beyond the outer edge by a different amount.

In a preferred embodiment of the connector part, the coil spring only at some parts of the groove of the connector part extends beyond an outer edge of the groove, while at the remaining parts of the groove, the coil spring is fully inside the groove. Accordingly, in a preferred mating connector part, rather than one annular groove there are one or more separate grooves with two ends to accommodate the coil spring where it extends beyond the groove of the connector part. For example, if the groove of the connector part is an annular groove and the coil spring extends beyond this annular groove only in two, preferably straight, parts on opposite sides of the groove, then the mating connector preferably comprises two, preferably straight grooves on opposite sides of the mating connector to accommodate the two parts of the coil spring.

BRIEF DESCRIPTION OF THE DRAWINGS

In the following, further preferred embodiments of the invention are illustrated by means of examples. The invention is not limited to these examples, however.

The drawings schematically show.

DETAILED DESCRIPTION OF AN EXEMPLARY EMBODIMENT OF THE INVENTION

Figure 1:
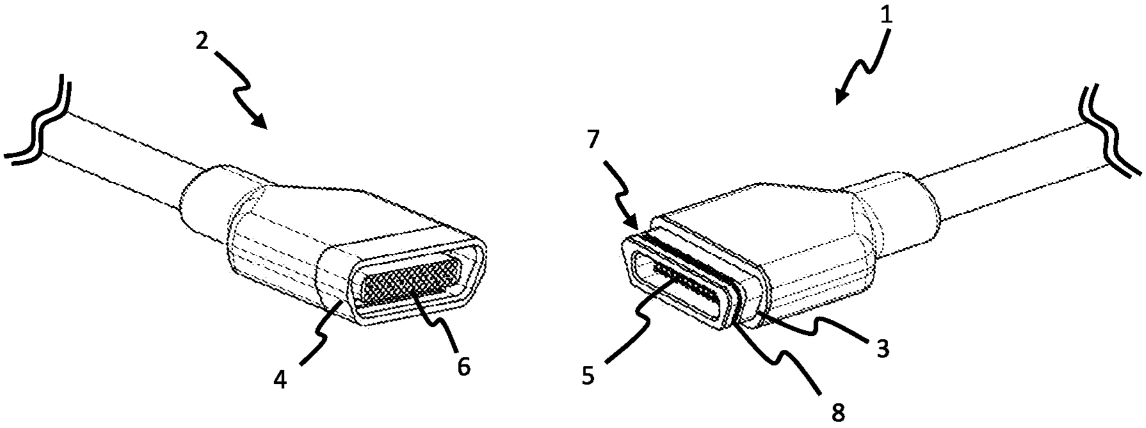
FIG. 1 A perspective view of a connector comprising of a connector part (right) and a mating connector part (left)

In the following description of preferred embodiments of the invention, identical reference numerals refer to identical or similar components.

A plug-in connector shown in FIG. 1 comprises a connector part 1 in the form of a plug, shown on the right, and a mating connector part 2 in the form of a receptacle, shown on the left. The connector part 1 has a sleeve 3 that can be inserted into a matching sleeve 4 of the mating connector part 2 to mate it with the latter. Both sleeves 3, 4 have a cross section that resembles an isosceles trapezium with two long parallel sides and rounded edges. The sleeves each surround a connector face 5, 6 comprising multiple pins (in the case of the connector part 1) and sockets (in the case of the mating connector part 2) and act as shielding members of the connector part 1 and the mating connector part 2 to shield the pins and the sockets from electromagnetic interference.

Figure 2:
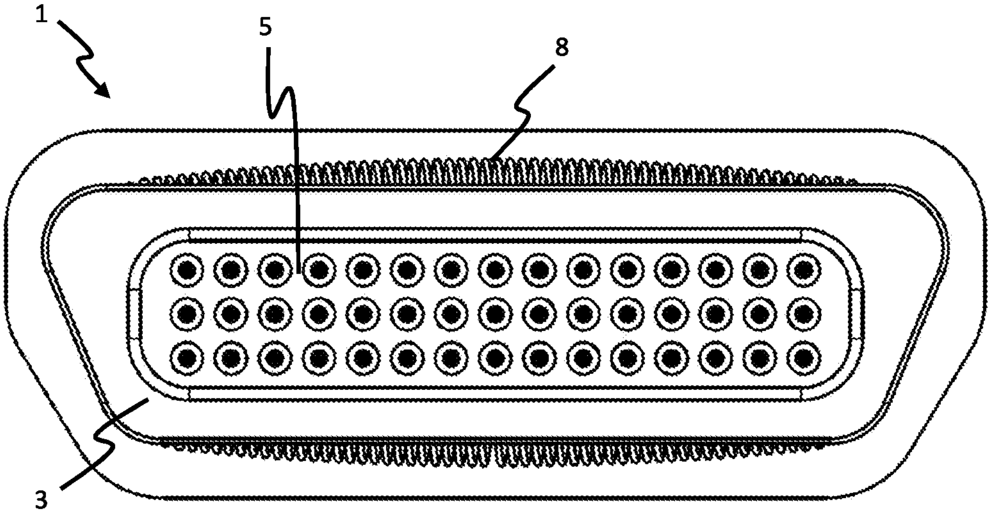
FIG. 2 A view onto the connector face of the connector part with a coil spring accommodated in a groove of the connector part, the coil spring lacking a longitudinal component.
Figure 4:
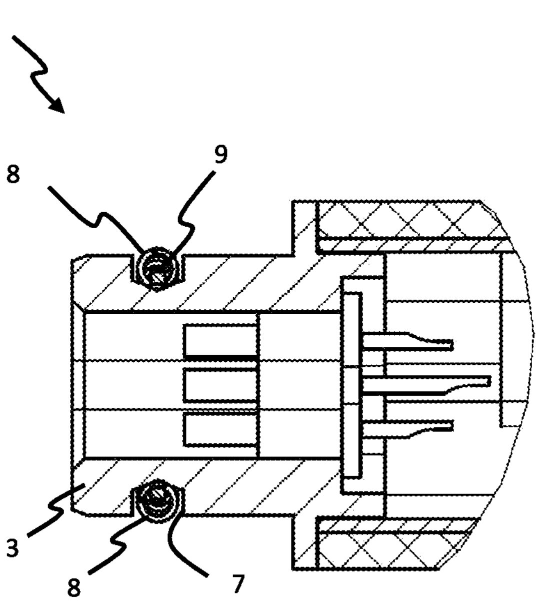
FIG. 4 A detailed cross-sectional view of the connector part of FIG. 3.
Figure 6:
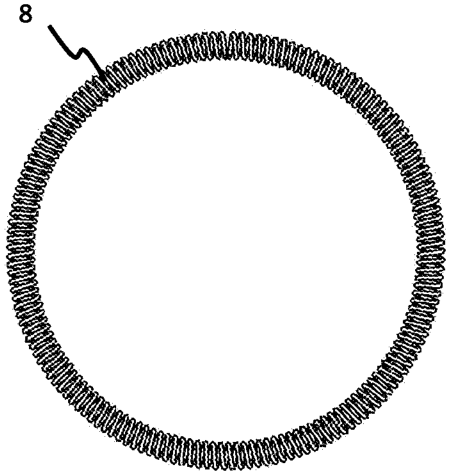
FIG. 6 An exemplary coil spring in its natural shape.

The sleeve 3 of the connector part 1 on its outer side comprises an annular groove 7, which, likewise, has the general shape of an isosceles trapezium with two long parallel sides and rounded edges. An annular helical coil spring 8 is accommodated in the groove 7, as can be best seen in FIG. 4. The coil spring 8 comprises multiple windings of a wire of metal, for example spring steel, and it has been formed by welding two ends of the coil spring together. The natural shape of the coil spring 8 is circular as shown in FIG. 6. As shown in FIG. 2, if this coil spring 8 is accommodated in the annular groove 7, its intrinsic resilience urges it into a shape in which it overly protrudes from the two long parallel sides. This can hamper insertion of the connector part 1 with the mating connector part 2, or it can damage the coil spring 8.

Figure 7:
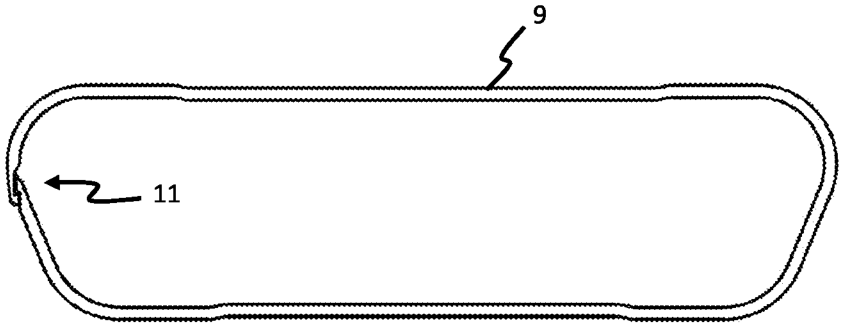
FIG. 7 An exemplary closed longitudinal component.

In order to overcome this problem, a longitudinal component 9 as shown in FIG. 7 is provided inside the annular coil spring 8, which runs generally along the direction of a longitudinal axis of the coil spring 8, is in contact with the inside of the annular coil spring 8 and biases the coil spring 8 into a shape different from its natural shape. The longitudinal component 9 extends along the entire length of the coil spring 8. Specifically, the longitudinal component comprises at least two parallel long straight sections. A third, short diagonal straight section is connected to the two parallel long straight sections by sectors of a circle. In combination, the sections of the longitudinal component 9 resemble the course of part of the groove 7, namely the two long parallel sides and one of the diagonal sides. Accordingly, when inside the coil spring 8, the longitudinal component 9 biases the coil spring 8 into a shape that is more similar to that of the groove 7 and in particular has two essentially parallel long sides, as shown in FIG. 8.

Figure 3:
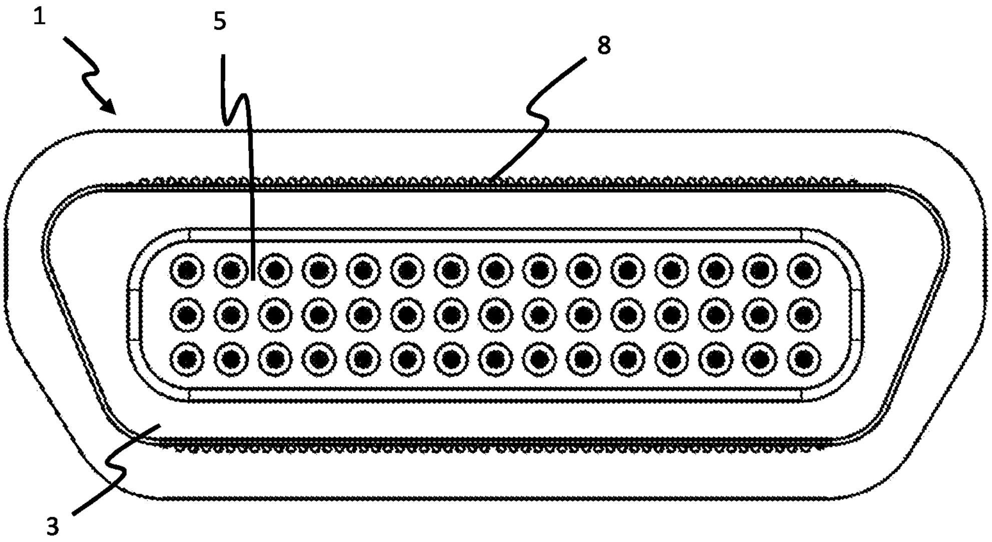
FIG. 3 A view onto the connector face of the connector part with a coil spring accommodated into a groove of the connector part, the coil spring being provided with a longitudinal component.

As a result, if the coil spring 8 comprising this longitudinal component 9 is accommodated in the groove 7, an excessive protrusion of the coil spring 8 from the two long parallel sides of the groove 7 is prevented. This is shown in FIG. 3. Insertion of the connector part 1 with the mating connector part 3 is facilitated and damage to the coil spring 8 is avoided. This is, because in particular the straight sections of the longitudinal component 9 bias the corresponding segments of the coil spring 8 towards the groove 7. The elevation view of FIG. 5 shows how, for this purpose, the longitudinal component 9 is in contact with the inner surface of the coil spring 8 to bias the coil spring 8 against the bottom of the long parallel sides of the groove 7, in particular with the straight sections of the longitudinal component 9.

Figure 5:
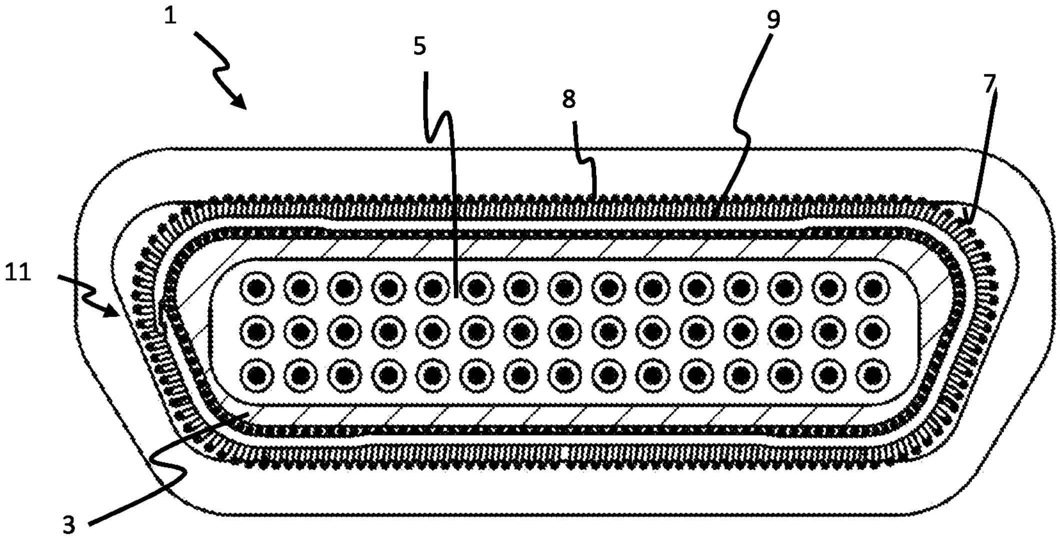
FIG. 5 A cross-sectional view of the connector part of FIGS. 3 and 4 in the plane of the coil spring exposing the coil spring and the longitudinal component inside the coil spring.
Figure 10:
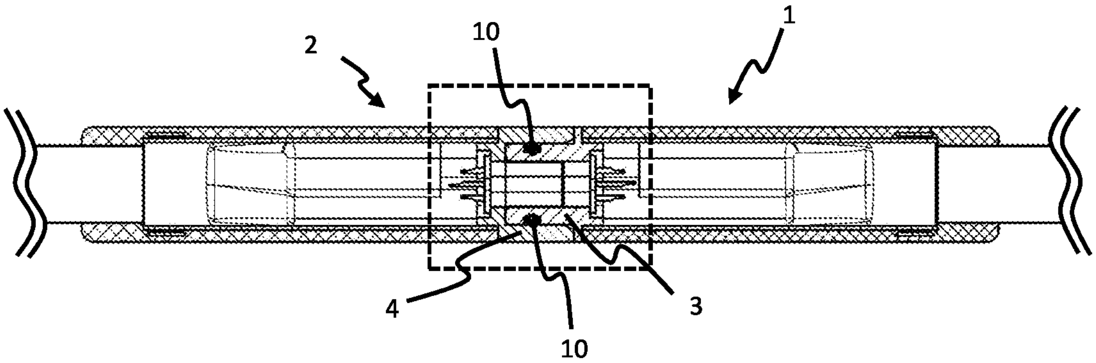
FIG. 10 A cross sectional view of the connector with the connector part mated with the mating connector part.
Figure 11:
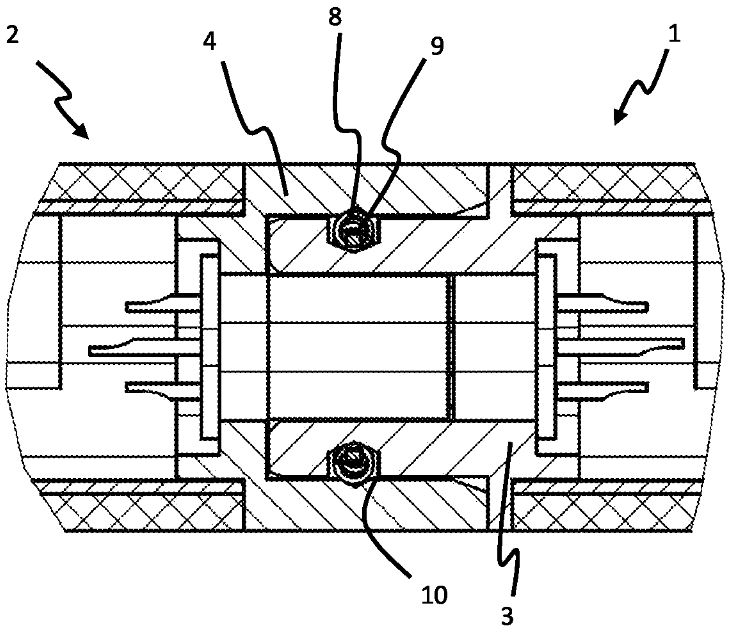
FIG. 11 A detail of FIG. 10.
Figure 12:
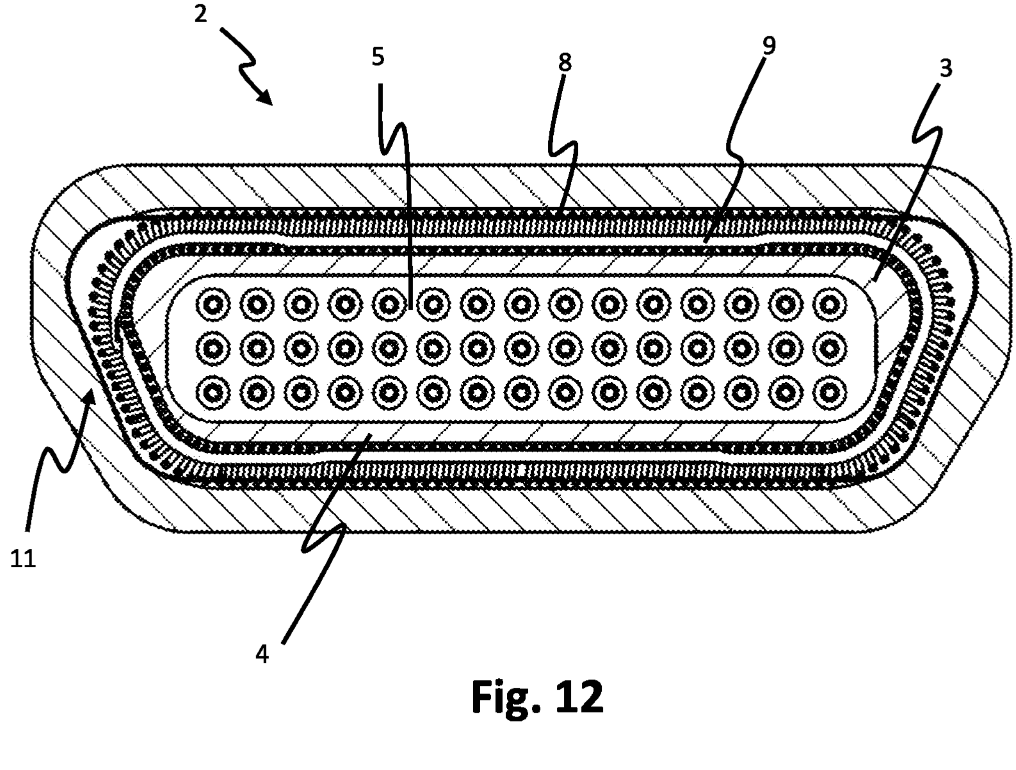
FIG. 12 A cross-sectional view of the connector part patent to the mating connector part in the plane of the coil spring exposing the coil spring and the longitudinal component inside the coil spring.

FIGS. 3 and 5 also show that the coil spring 8 is entirely contained within the groove 7, with the exception of the long parallel sides of the groove 7, from which the coil spring 8 somewhat protrudes. This is, because, as can be best seen in FIG. 5, the groove 7 is of non-uniform depth; at the diagonal side portions (right and left in FIG. 5), the grove 7 is deep enough to fully accommodate the coil spring 8, while along the long parallel sides, the groove 7 is shallower in order to make the coil spring 8 protrude somewhat beyond the groove's 7 outer edge. When the connector part 1 is mated with the mating connector part 2, these protruding parts of the coil spring 8, due to the coil spring's 8 resilience, are loaded between the connector part 1 and the counter connector part 2, more precisely between the sleeve 3 of the connector part 1 and the sleeve 4 of the mating connector part 2 as is shown in FIGS. 10 to 12. The coil spring 8 thereby provides a well-defined electrical contact between the connector part 1 and the mating connector part 2. Thereby, a continuity of radio frequency shielding from the connector part 1 to the mating connector part 2 is achieved.

Figure 8:
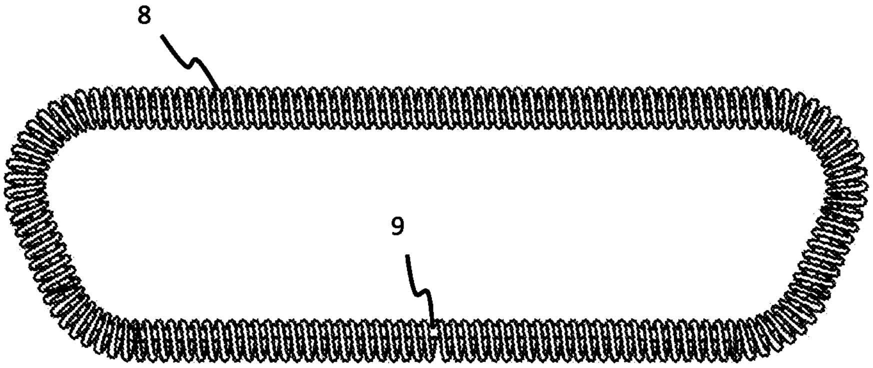
FIG. 8 The coil spring of FIG. 6 with the closed longitudinal component of FIG. 7 inside.

In FIG. 7 an exemplary shape of the longitudinal component 9 is provided, and further more in FIG. 8 it is shown in which shape the longitudinal component 9 can bias the coil spring 8 when the coil spring 8 with the longitudinal component 9 is accommodated in a corresponding groove 7 of the connector part 7. Typically, this shape will resemble the shape of the groove 7 in which the coil spring 8 is accommodated. The longitudinal component 8 is non-circular. As can be seen best from FIG. 7, the longitudinal component 8 comprises two parallel sections with the shape of a straight line and two segments with the shape of a segment of a circle. Such shapes are surprisingly stable for fixing the coil spring 8 inside the groove 7.

The longitudinal component 9 increases or decreases the curvature of at least a section along the length of the coil spring 8 as compared to the curvature this section has when the coil spring 8 is in its natural shape and/or in the shape into which the coil spring 8 is biased by the groove 7 alone.

Optionally the parallel straight sections of the longitudinal component 9 can be slightly curved outwardly towards the groove 7 for increased stability.

The longitudinal component 9 can further be fixed to the sleeve 3 of the connector part 1 inside the groove 7. As a result, when it is inside the coil spring 8 and the coil spring 8 is inside the connector part's 1 groove 7, the longitudinal component 9 urges the coil spring 8 with increased force against the bottom of the parallel long sides of the groove 7. Due to the longitudinal element's 9 bias, the coil spring 8 is clamped into the groove 7 and held firmly therein.

As can also be seen in FIGS. 10 to 12, the sleeve 4 of the mating connector part 2 comprises two parallel straight grooves 10 on its inside for the parts of the coil spring 8 that protrude from the groove 7 of the sleeve 3 of the connector part 1 to latch into. As a result, the connector part 1 can latchingly be attached to the mating connector part 2 of the connector. The grooves 10 are considerably shallower than the groove 7 of the connector part 1 so that upon separation of the connector part 1 from the mating connector part 2, the coil spring 8 remains on the connector part 1.

Figure 9:
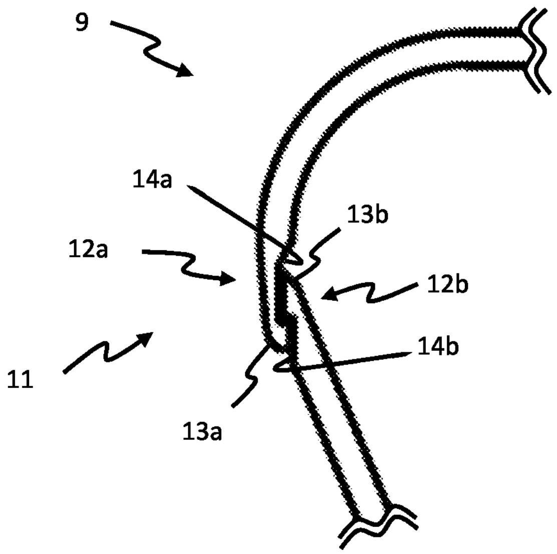
FIG. 9 A detail view on the connecting mechanism of the longitudinal component of FIG. 7.

The longitudinal component 9 of FIG. 7 comprises an interlocking area 11, which is shown in detail in FIG. 9. The longitudinal component 9 is closed interlockingly. Moreover, the longitudinal component 9 comprises a first end and a second end in the interlocking area 11. The first end is equipped with a first locking element 12*a* and the second end is equipped with a second locking element 12*b*. In the example of FIGS. 7 and 9, the first locking element 12*a* comprises a protrusion 13*a* and a recess 14*a*, whereas the second locking element 12*b* comprises a protrusion 13*b* and a recess 14*b*. The first locking element 12*a* and the second locking element 12*b* are connectable with each other and are form-lockingly connected. As can be seen best in FIG. 9, the protrusion 13*a* of the first locking element 12*a* is inserted in the recess 14*b* of the second locking element 12*b* and thus accommodated therein. In addition, the protrusion 13*b* of the second locking element 12*b* is inserted in the recess 14*a* of the first locking element 12*a*. Thus, the locking element 12*a* and the second locking element 12*b* are interlockingly engaging with each other and stably connected. Furthermore, a restoring force of the longitudinal component 9 further stabilises the closed configuration of the two ends, resulting in a force-locked connection between the two ends. The first locking element 12*a* and the second locking element 12*b* can be opened and closed non-destructively and reversibly for simple installation of the longitudinal component 9 in the coil spring 8.

In an exemplary method of manufacturing the coil spring 8 according to the present invention, both the coil spring 8 formed of interconnected coils and the longitudinal component 9 are in an open stated before being combined with each other. For combining, the coil spring 8 is then slid over the longitudinal component 9. Subsequently, the longitudinal component 9 is closed, for example by interlocking as discussed above, by welding, by soldering or by adhesive bonding. The ends of the coil spring 8 are either likewise joined together, for example by welding, soldering or adhesive bonding, or they are left open.

In an alternative exemplary embodiment that is not shown in the figures, the longitudinal component 9 is a closed loop that lacks any means for fastening. Rather, it is cut from a tube, punched out or cut out from a metal sheet, or welded, soldered or materially joined to for a closed loop. The longitudinal component 9 is in the closed state before being combined with the coils to form the coil spring 8. In the step of combining, the coils are wound around the longitudinal component 9 to form the coils spring. The ends of the coil spring 8 are joined together by welding, soldering or adhesive bonding.

In coil springs 8 with open longitudinal components (not shown), it is possible that the open longitudinal component (not shown) is unintentionally pulled out of the coil spring 8 leading to damage and undesired unfastening. A coil spring 8 with a closed longitudinal component 9 prevents unintentional removing of the longitudinal component 9 from the coil spring 8 and additionally leads to a more stable fixation of the coil spring 8 inside the groove 7.

The features as described in the above description, claims and figures can be relevant individually or in any combination to realise the various embodiments of the invention.

What is claimed is:

1. A connector part configured for being connected with a mating connector part, wherein the connector part comprises a coil spring, the coil spring comprising a longitudinal component located within the coil spring, wherein the longitudinal component runs generally along the direction of a longitudinal axis of the coil spring, and the longitudinal component is closed or configured for being closed, wherein the longitudinal component has at least one straight section, wherein the longitudinal component comprises a first end equipped with a first locking element and a second end equipped with a second locking element, wherein the first locking element and the second locking element are interlocked or configured for being interlocked.

2. The connector part according to claim 1, wherein the longitudinal component has at least two straight sections.

3. The connector part according to claim 1, wherein the longitudinal component has the general shape of a trapezium, a parallelogram or a rectangle, wherein the corners may be rounded.

4. The connector part according to claim 1, wherein the longitudinal component is a simple loop.

5. The connector part according to claim 1, wherein the longitudinal component biases the coil spring into a shape different from the coil spring's natural shape.

6. The connector part according to claim 1, wherein the longitudinal component comprises a first end and a second end which are connected to or connectable with each other.

7. The connector part according to claim 6, wherein the first end and the second end and the longitudinal component are in the same plane throughout the entire length of the longitudinal component.

8. The connector part according to claim 1, wherein at least the first locking element comprises a recess and at least the second locking element comprises a protrusion, wherein the recess accommodates the protrusion or is configured for accommodating the protrusion.

9. The connector part according to claim 1, wherein the longitudinal component is a metal wire.

10. The connector part according to claim 1, wherein the longitudinal component is formed as a single piece.

11. The connector part according to claim 1, wherein the connector part comprises a groove in which the coil spring is accommodated.

12. A connector comprising a connector part according to claim 1 and a mating connector part.

13. A connector part configured for being connected with a mating connector part, wherein the connector part comprises a coil spring, the coil spring comprising a longitudinal component located within the coil spring, wherein the longitudinal component runs generally along the direction of a longitudinal axis of the coil spring, and the longitudinal component is closed or configured for being closed, wherein the longitudinal component has at least one straight section and wherein the longitudinal component comprises a first end and a second end materially connected to each other.

* * * * *